(12) United States Patent
Purvis

(10) Patent No.: US 9,880,039 B1
(45) Date of Patent: Jan. 30, 2018

(54) METHOD AND APPARATUS FOR COLLECTING AND PROVIDING SENSOR DATA

(71) Applicant: Sensus USA, Inc., Raleigh, NC (US)

(72) Inventor: Zane Dustin Purvis, Raleigh, NC (US)

(73) Assignee: Sensus USA, Inc., Raleigh, NC (US)

( * ) Notice: Subject to any disclaimer, the term of this patent is extended or adjusted under 35 U.S.C. 154(b) by 0 days.

(21) Appl. No.: 15/215,256

(22) Filed: Jul. 20, 2016

(51) Int. Cl.
| G08B 23/00 | (2006.01) |
| G01F 15/06 | (2006.01) |
| G01F 1/34 | (2006.01) |
| H04Q 9/00 | (2006.01) |

(52) U.S. Cl.
CPC .............. *G01F 15/063* (2013.01); *G01F 1/34* (2013.01); *H04Q 9/00* (2013.01); *H04Q 2209/60* (2013.01)

(58) Field of Classification Search
CPC ..................................................... G01F 15/063
USPC ..................................................... 340/870.02
See application file for complete search history.

(56) References Cited

U.S. PATENT DOCUMENTS

| 5,790,432 | A | 8/1998 | Morys | |
| 6,594,382 | B1* | 7/2003 | Woodall | G06K 9/4609 382/156 |
| 2007/0268128 | A1* | 11/2007 | Swanson | H04Q 9/00 340/539.22 |
| 2009/0055120 | A1 | 2/2009 | Vickery et al. | |
| 2011/0304475 | A1* | 12/2011 | Higgins | H04Q 9/00 340/870.07 |
| 2011/0307221 | A1* | 12/2011 | Higgins | G01F 15/063 702/187 |
| 2012/0306613 | A1* | 12/2012 | De La Rue | H04W 4/005 340/5.2 |
| 2013/0034234 | A1* | 2/2013 | Chen | H04M 1/72591 381/58 |
| 2015/0250419 | A1* | 9/2015 | Cooper | A61B 5/6804 600/301 |
| 2015/0289814 | A1* | 10/2015 | Magar | A61B 5/0205 600/301 |
| 2015/0341438 | A1* | 11/2015 | Sloan | H04W 4/008 455/41.2 |
| 2016/0069937 | A1* | 3/2016 | Johnson | G01R 15/16 324/126 |

(Continued)

FOREIGN PATENT DOCUMENTS

EP 0624797 A2 11/1994

*Primary Examiner* — Santiago Garcia
(74) *Attorney, Agent, or Firm* — Murphy, Bilak & Homiller, PLLC

(57) ABSTRACT

According to a method and apparatus disclosed herein, an electronic register advantageously logs raw sensor data without converting the raw sensor data into physical-domain measurements, and without need for being configured to understand or process such data, or account or compensate for any sensor installation particulars. Instead, the electronic register advantageously stores conversion data in association with each sensor interface circuit being used to collect raw sensor data from a corresponding external sensor, and it provides the conversion data to an external device, in association with read-out of the raw sensor data logged by the electronic unit. The conversion data provides the mathematical expression, along with any compensation or adjustment values needed, to convert the raw sensor data into corresponding physical-domain measurements.

25 Claims, 4 Drawing Sheets

(56) References Cited

U.S. PATENT DOCUMENTS

2016/0169716 A1    6/2016  Laflen et al.
2016/0183854 A1*  6/2016  Lee .................... A61B 5/14532
                                                               600/347
2016/0331232 A1* 11/2016  Love ...................... A61B 5/002
2017/0061236 A1*  3/2017  Pope .................... G06K 9/4671

* cited by examiner

METHOD AND APPARATUS FOR COLLECTING AND PROVIDING SENSOR DATA

TECHNICAL FIELD

The present invention relates to electronic registers, and particularly relates to an electronic register that collects and provides sensor data.

BACKGROUND

"Electronic registers" find wide application across a broad range of industries, including the utility industries, where electronic registers provide critical metering capabilities for gas, electric, water, or other consumables provided on a metered basis. Electronic registers provide a ready mechanism for logging consumption data and, more generally, various types of sensor data, such as fluid level measurements, etc.

With their flexibility and wide usage, however, comes a number of challenges. For example, the designers, manufacturers, and distributors of electronic registers have a keen interest in reducing production costs, maintenance, and support issues, and simplifying the models that need to be stocked, serviced, etc. Customers, on the other hand, require electronic registers that are, in at least some respects, fine-tuned to their particular applications or installations. Difficulties, therefore, arise when attempting to field a base register design that accommodates a wide range of applications, while offering needed features and particularized operation suiting specific applications.

To appreciate some of these difficulties, consider the example components of a typical electronic register. In an exemplary but non-limiting case, an electronic register includes processing circuitry, communication circuitry, and sensor interface circuitry. However, the processing details and, in particular, the processing and logging of the sensor data, depends on the type of sensors and sensor data involved. The various aspects of data handling, such as resolution, scaling, etc., must be preprogrammed or otherwise provisioned in the electronic register before field deployment, which complicates production, distribution, inventory management, installation management, etc.

SUMMARY

According to a method and apparatus disclosed herein, an electronic register advantageously logs raw sensor data without converting the raw sensor data into physical-domain measurements, and without the need for being configured to understand or process such data, or account or compensate for any sensor installation particulars. Instead, the electronic register advantageously stores conversion data in association with each sensor interface circuit being used to collect raw sensor data from a corresponding external sensor, and it provides the conversion data to an external device, in association with the read-out of the raw sensor data logged by the electronic unit. The conversion data provides the mathematical expression, along with any compensation or adjustment values needed, to convert the raw sensor data into corresponding physical-domain measurements.

In an example method, the electronic register receives conversion data from a first external device, via communication interface circuitry of the electronic register, for a sensor interface circuit of the electronic register. The conversion data comprises information for converting raw sensor data obtained from an external sensor coupled to the sensor interface circuit into corresponding physical-domain measurements, and the electronic register stores the conversion data in the electronic register, in logical association with the sensor interface circuit.

Further, according to the method, the electronic register obtains the raw sensor data from the external sensor, via the sensor interface circuit, and logs the raw sensor data in the electronic register, in logical association with the stored conversion data, and without converting the logged raw sensor data into the corresponding physical-domain measurements. Still further, the electronic register outputs the stored conversion data and the logged raw sensor data logically associated with the stored conversion data, to the same or another external device, via communication interface circuitry of the electronic register. The electronic register performs the outputting operation responsive to a trigger, e.g., detection of the external device, or receipt of a request for such information, etc.

In a related example, an electronic register comprises communication interface circuitry configured for communicating with one or more external devices, a sensor interface circuit configured to interface with an external sensor, and processing circuitry including or operatively associated with the communication interface circuitry, the sensor interface circuit, and storage. The processing circuitry is configured to receive conversion data from a first external device, for the sensor interface circuit, the conversion data comprising information for converting raw sensor data obtained from the external sensor into corresponding physical-domain measurements.

The processing circuitry is further configured to store the conversion data in the storage, in logical association with the sensor interface circuit, obtain the raw sensor data from the external sensor, via the sensor interface circuit, and log the raw sensor data in the storage, in logical association with the stored conversion data, and without converting the logged raw sensor data into the corresponding physical-domain measurements. Further, in response to a trigger, the processing circuitry is configured to output the stored conversion data and the logged raw sensor data logically associated with the stored conversion data, to the first external device, or to a second external device.

In yet another example, an electronic register implements a method that includes receiving conversion data for each of two or more sensor interface circuits of the electronic register, wherein the conversion data received for each sensor interface circuit comprises information for converting raw sensor data obtained from the sensor interface circuit into corresponding physical-domain measurements. The method includes storing the conversion data received for each sensor interface circuit in logical association with the sensor interface circuit, logging the raw sensor data obtained from each sensor interface circuit in logical association with the conversion data received and stored for the sensor interface circuit, and without converting the raw sensor data into the corresponding physical-domain measurements. Further, the method includes outputting the logged raw sensor data for any one of the sensor interface circuits to an external device, along with the conversion data received and stored for the sensor interface circuit, thereby enabling the external device to convert the logged raw sensor data into the corresponding physical-domain measurements.

Of course, the present invention is not limited to the above features and advantages. Those of ordinary skill in the art will recognize additional features and advantages upon

DETAILED DESCRIPTION

Figure 1:
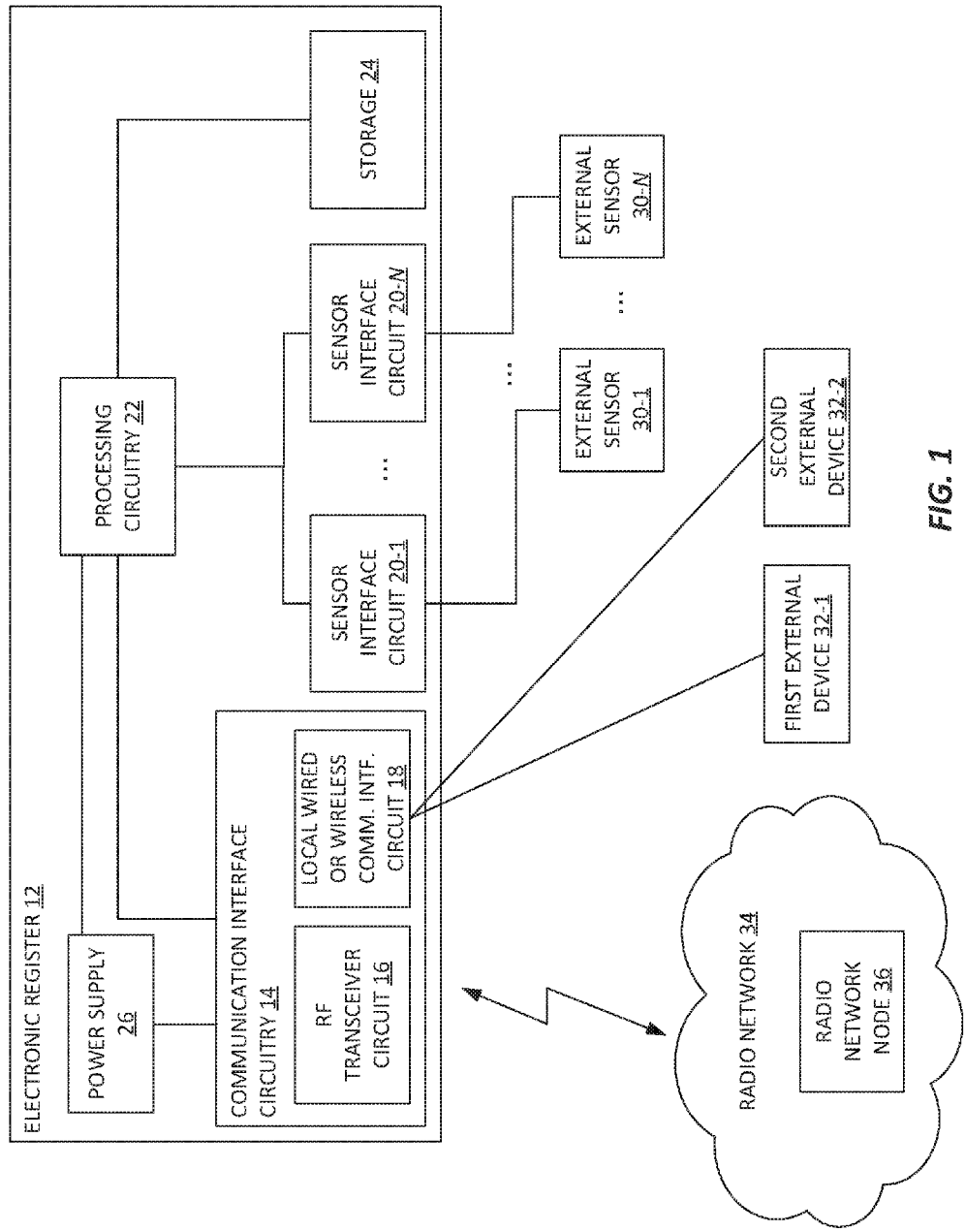
FIG. 1 is a block diagram of one embodiment of an electronic register configured to interface with one or more external sensors and to log raw sensor data obtained therefrom.

By way of non-limiting example, FIG. 1 illustrates an embodiment of an electronic register 12. According to the example, the electronic register 12 includes communication interface circuitry 14, which in turn includes a radio frequency (RF) transceiver circuit 16, and a "local" wired or wireless communication interface circuit 18. Further included are one or more sensor interface circuits 20, shown by way of example as sensor interface circuits 20-1 through 20-N, processing circuitry 22, storage 24, and a power supply 26.

Each sensor interface circuit 20 is configured to interface with an external sensor 30. e.g., the sensor interface circuit 20-1 interfaces with an external sensor 30-1, and the sensor interface circuit 20-2 interfaces with an external sensor 30-2. The number "20" is used without suffixing to refer to single sensor interface circuits, and to refer to multiple sensor interface circuits. Suffixing appears only where needed for clarity and use of the reference number 20 in this generalized fashion does not mean that each sensor interface circuit 20 is identical to the next one. The reference number "30" is used the same way, and such usage does not mean that each external sensor 30 is identical to the next one.

In some embodiments, the electronic register 12 does include two or more sensor circuits 20 that are "like" sensor circuits, i.e., of the same type, design, and implementation. For example, the at least two like sensor interface circuits 20 comprise two or more analog current loop interfaces or two or more analog voltage interfaces having like nominal current or voltage ranges. In the same embodiment, or in other embodiments, however, at least two of the sensor interface circuits 20 are different in type, design, and implementation. One type of sensor interface circuit 20 comprises a digital counter or pulse input, another type of sensor interface circuit 20 comprises a current signal interface, and yet another type of sensor interface circuit 20 comprises a voltage signal interface.

The electronic register 12 provides advantageous mechanisms for interfacing with individual sensors 30, with respect to their particular sensor types, their particular operational characteristics, and their particular installation details. These mechanisms may be exercised or accessed. e.g., through the communication interface circuit 18 and/or through the RF transceiver circuit 16, if present and configured for such use.

In an example implementation, the communication interface circuit 18 is configured for communicating with one or more external devices 32 that are used to read sensor data and associated information from the electronic register 12. In at least one embodiment, the communication interface 18 allows an external device 32 to configure the electronic register 12 with respect to individual ones of the sensor interface circuits 30. Two external devices 32-1 and 32-2 are shown by way of example, e.g., the device 32-1 may be operative as a "configurator" for setting up the electronic register 12 with respect to one or more external sensors 30, while the device 32-2 may be operative as a "reader" or "interrogator" for reading out logged sensor data and other information from the electronic register 12. Of course, the same device 32 may provide both capabilities, based on user authorization, etc. In an example case, a laptop computer is configured to operate as the external device 32-1 and/or 32-2, but proprietary or dedicated devices 32 may also be used.

Other means of accessing or communicating with the electronic register are available in embodiments that include the RF transceiver circuit 16. That circuitry comprises, for example, a cellular radio modem or other wide-area radio interface that is configured to communicatively couple the electronic register 12 to an Advanced Metering Infrastructure (AMI), such as represented by the depicted radio network 34 and the associated radio network node 36.

Other embodiments of the electronic register 12 may omit the RF transceiver circuit 16, in favor of relying on the local communication interface 18 for the collection of logged data, etc., by one or more external devices 32. Non-limiting examples of the local communication interface circuit 18 include Near Field Communication (NFC) circuitry, a Wi-Fi interface, a Bluetooth interface, an Ethernet interface, or an RS-232 or other wired serial interface. In general, the local communication interface circuit 18 is configured for bi-directional communication between the electronic register 12 and one or more external device(s) 32.

With the above in mind, in at least one embodiment, the electronic register 12 comprises communication interface circuitry 14 configured for communicating with one or more external devices 32, a sensor interface circuit 20 configured to interface with an external sensor 30, and processing circuitry 22 including or operatively associated with the communication interface circuitry 14, the sensor interface circuit 20, and storage 24. The processing circuitry 22 is configured to receive conversion data from a first external device 32-1, for the sensor interface circuit 20. The conversion data comprises information for converting raw sensor data obtained from the external sensor 30 into corresponding physical-domain measurements, and the processing circuitry 22 is configured to store the conversion data in the storage 24, in logical association with the sensor interface circuit 20.

The processing circuitry 22 is further configured to obtain the raw sensor data from the external sensor 30, via the sensor interface circuit 20, and log the raw sensor data in the storage 24, in logical association with the stored conversion data, and without converting the logged raw sensor data into the corresponding physical-domain measurements. That approach enables the processing circuitry 22 to log data from an arbitrary sensor chosen by the user, but unknown to the manufacturer of the electronic register 12 a priori. No firmware modification is required to support a different type of sensor, yet multiple interrogation devices can use the conversion data and display physical-domain measurement values to the user.

The processing circuitry 22 also increases its efficiency and avoids complexity by logging the raw sensor data, rather than "converting" the raw sensor data into units of measurement associated with the physical parameter being measured by the involved external sensor 30. The capability of making such conversions is, however, advantageously preserved by maintaining the logged raw sensor data in logical association with the stored conversion data needed to convert the logged raw sensor data into corresponding physical-domain measurement values.

In particular, the processing circuitry 22 is configured to, in response to a trigger, output the stored conversion data and the logged raw sensor data logically associated with the stored conversion data, to the first external device 32-1, or to a second external device 32-2. The trigger may be external—such as a reading event—or may be internal, such as the expiration of a timer internal to the electronic register 12. The processing circuitry 22 in at least some embodiments is configured to output the stored conversion data and the associated logged raw sensor data to a metering network—i.e., the AMI infrastructure—via the RF transceiver circuit 16.

As an example, the "trigger" in question is the detection by the electronic register 12 the presence of an external device 32. Such detection may be more nuanced. For example, "detection" in one or more embodiments comprises detecting the presence of the external device 32, and determining that the external device 32 is authorized to receive logged raw sensor data, etc., from the electronic register 12. Authorization may be determined based on simple protocol handshaking, or may be more involved, e.g., password or other credential verification, or key-based authentication. In another example, the "trigger" in question is the receipt of request or command from an external device 32.

In one or more embodiments, the processing circuitry 22 is configured to obtain the raw sensor data from any given external sensor 30 by reading a sensor signal output from the external sensor 30 and normalizing the readings according to a defined numeric representation. Here, it will be understood that the processing circuitry 22 uses the corresponding sensor interface circuit 20 to "read" the sensor signal output from the external sensor 30. In at least one such embodiment, the processing circuitry 22 is configured to normalize the readings according to the defined numeric representation. For example, the processing circuitry 22 normalizes the readings by formatting them according to a defined fixed-point or floating-point data type used by the electronic register 12. The data normalization allows the electronic register to handle readings from disparate sensor types and/or configurations in a uniform manner, and it simplifies logging, memory management, etc. In turn, these simplifications correspond to simplifications in the design, programming, and operation of the electronic register 12.

As an example of the advantages flowing from the normalization of raw sensor data, the processing circuitry 22 in one or more embodiments is configured to obtain the raw sensor data from a given external sensor 30 as digital readings obtained from the sensor interface circuit 20 associated with the given external sensor 30. In this example, the sensor interface circuit 20 is configured to digitize an analog sensor signal output by the given external sensor 30. Additionally, or alternatively, the electronic register 12 includes a sensor interface circuit 20 that is configured to receive an analog or digital signal from an external sensor 30 that is indicative of count values, and the processing circuitry 22 is configured to log the indicated count values in a normalized form.

In another illustrative example, the electronic register 12 includes at least two sensor interface circuits 20. e.g., a first sensor interface circuit 20-1 and a second sensor interface circuit 20-2. The processing circuitry 22 is configured to receive and store respective conversion data for each of the sensor interface circuits 20, log the raw sensor data obtained for each sensor interface circuit 20 in logical association with the respective stored conversion data, and, when outputting the logged raw sensor data for any given one of the sensor interface circuits 20, to output the respective stored conversion data.

In more detail, the processing circuitry 22 is configured to store conversion data for a sensor interface circuit 20-1/external sensor 30-1, log raw sensor data obtained from the sensor interface circuit 20-1 in logical association with the corresponding conversion data, and output that corresponding conversion data for the logged raw sensor data. The same operations are performed with respect to a sensor interface circuit 20-2/external sensor 30-2. Consequently, regardless of whether the two external sensors 30-1 and 30-2 are nominally the same, the particulars of each sensor installation can be accounted for without modifying the basis operation of the electronic register 12, simply by loading appropriately configured conversion data into the electronic register 12, for each external sensor 30.

In this regard, the conversion data stored by the processing circuitry 22 in the storage 24 for any particular sensor interface circuit 20 and its corresponding external sensor 30 comprises, for example, the calculation or formula used for converting the corresponding logged raw sensor data into physical-domain measurements. For example, an external sensor 30 outputs an analog voltage or current signal corresponding to sensed gas pressure in PSI, the associated sensor interface circuit 20 digitizes the sensor signal into corresponding analog-to-digital converter (ADC) count values, e.g., values between 0 and 1023 for a ten-bit ADC.

These count values, which may be normalized, e.g., to a 32-bit format, correspond to a range of gas pressure and the conversion data would be, for example:

$$P_{measured} = \frac{count_{logged}}{1023} \times P_{max},$$

where $P_{max}$ is the top of the sensing pressure range, and $count_{logged}$ is the raw ADC count value (in normalized form).

However, it is contemplated herein that the conversion data in one or more embodiments provides for a much richer pairing of given external sensors 30 to the electronic register 12, without adding any complication to the operation of the electronic register 12. For example, the conversion data loaded into the electronic register 12 for a given external sensor 30 may include one or more calibration values, e.g., coefficients for scaling errors, sensor offsets, etc. The "intelligence" for parsing and applying the conversion data resides in the external devices 32 (and/or remote network nodes), rather than in the electronic register 12. Moreover, the electronic register 12 need only reserve sufficient storage for holding the conversion data for each of its sensor interfaces 20, e.g., 512 bytes, 1024 bytes, etc., to serve as a blank slate for loading whatever type of conversion data is needed or desired.

Such an approach obviates the need for preconfiguring the electronic register 12 for the particulars of any installation, as the only real requirement is that the electronic register 12 includes sensor interface circuits 20 that are compatible with the type(s) of external sensor(s) 30 deployed at a given installation. Moreover, the electronic register 12 from one location can be moved to another location and immediately be "tuned" or adapted to the particulars of the external sensors 30 at the new location, merely by loading the appropriate conversion data into the electronic register 12.

As another advantage, it is contemplated herein that one or more embodiments of the electronic register 12 are configured to provide alarm functionality with respect to the external sensors 30. e.g., to alarm on high or low signals, signal ranges, etc., corresponding to critical physical-domain measurement thresholds or ranges. Because the electronic register 12 foregoes any conversion of the logged raw sensor data into the physical domain, it advantageously ties its alarm functionality to an alarm threshold provided to it for any given sensor interface circuit 20. The alarm threshold is expressed as a unit-less numeric value in a same numeric range as used for the logged raw sensor data obtained from the involved external sensor 30. For example, the alarm threshold is expressed in normalized ADC counts.

The processing circuitry 22 is configured to receive such alarm thresholds from an external device 32 and/or through the radio network 34, and to store the alarm thresholds in logical association with the respective sensor interface circuits. The processing circuitry 22 is further configured to output an alarm signal responsive to determining that the logged raw sensor data from a given external sensor 30 violates the alarm threshold loaded in the electronic register 12 for that sensor 30.

Still further, in one or more embodiments, the processing circuitry 22 is configured to receive, store, and subsequently output reverse conversion data for any given sensor interface circuit 20. The reverse conversion data comprises information for converting the involved physical domain measurements into corresponding raw sensor data values, thereby enabling an external device 32 to use the reverse conversion data to convert physical-domain alarm thresholds expressed in physical-domain measurement units into corresponding unit-less alarm thresholds for the electronic register 12. In other words, an operator of the external device 32 sets an alarm threshold in the physical domain, e.g., sets a high or low gas pressure alarm in PSI, and the external device 32 calculates the corresponding raw sensor data values and returns those values to the electronic register 12 as alarm thresholds.

The outputting of alarm signals comprises, for example, outputting alarm signaling via the local communication interface 18 and/or via the RF transceiver circuit 16, for network-based alarm reporting.

More generally, in at least one embodiment, the electronic register 12 is configured to output its stored conversion data and the logged raw sensor data logically associated with the stored conversion data, based on transmitting the stored conversion data and the logged raw sensor data to the radio network node 36, as a first or second external device 32. That is, in some embodiments, the external device 32 is a remote node or server communicatively coupled to the electronic register 12 via the radio network 34. As noted, however, the first or second external device 32 may comprise a portable communication unit for reading or configuring the electronic register 12. In such cases, the electronic register 12 is configured to communicate with the portable communication unit via a local wired or wireless connection.

Figure 2:
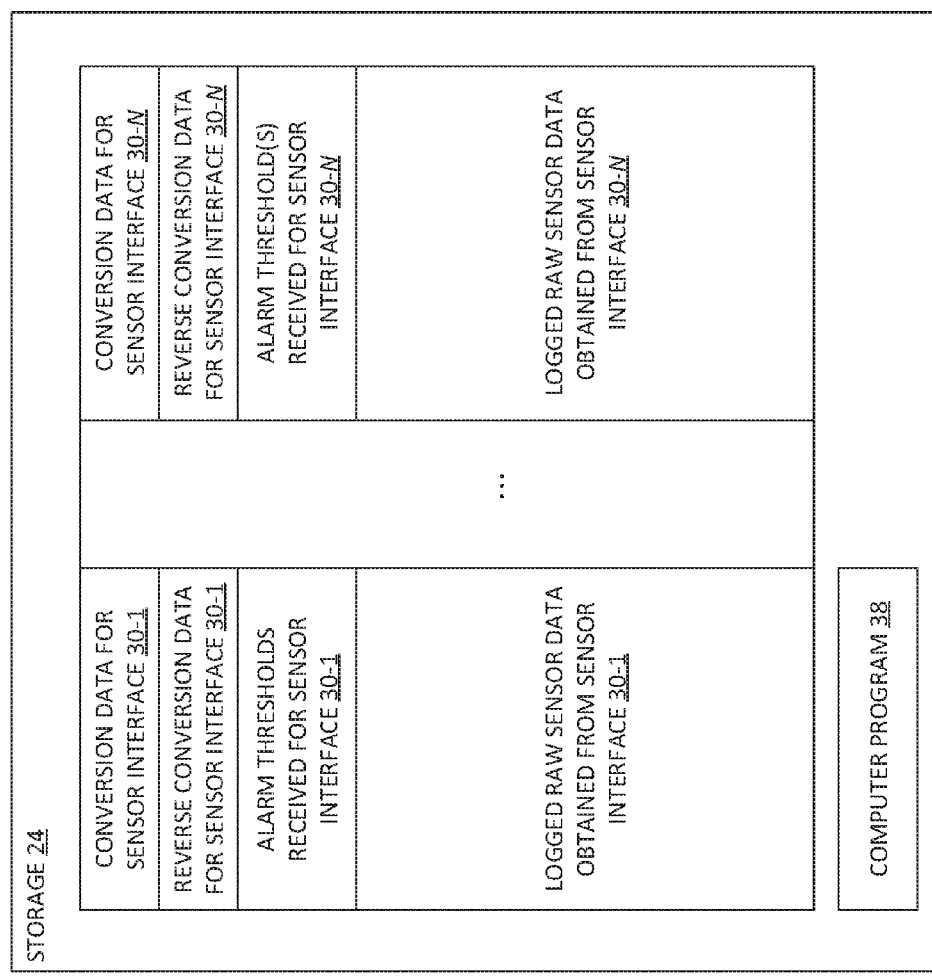
FIG. 2 is a diagram of one embodiment of the logical associations contemplated herein for the storage of logged raw sensor data and corresponding conversion data.

FIG. 2 illustrates an example of the storage 24, which in one or more embodiments provides volatile and non-volatile storage, e.g., working or data memory, along with program and data storage. While the storage 24 may comprise more than one type of storage—e.g., more than one type of memory or storage circuit—it shall be broadly understood as comprising a computer-readable medium, that includes storage for the aforementioned conversion data, the reverse conversion data, the alarm thresholds, and the logged raw sensor data. As suggested in the illustrated example, such storage is at least logically partitioned on a per-sensor interface circuit basis, so that such data is stored for each sensor interface circuit 20. Of course, depending on the memory management implemented in the electronic register 12, the storage 24 need not be pre-partitioned, and such partitioning may be purely logical and performed dynamically, or on an ad hoc basis, by the processing circuitry 22.

The storage 24 in one or more embodiments also stores a computer program 38 comprising program instructions that, when executed by one or more processing circuits of the electronic register 12, specially adapts such processing circuits to operate as the aforementioned processing circuitry 22. For such operation, the storage 24 provides non-transitory storage for the computer program 38, where "non-transitory" does not necessarily mean permanent or unchanging but does connote storage of at least some persistence, e.g., the program instructions are held in memory for execution.

As such, the storage 24 comprises, for example, SRAM, DRAM, or other working memory, along with FLASH, EEPROM, SSD, or other non-volatile storage circuitry, and the processing circuitry 22 in one or more embodiments comprises one or more microprocessor-based circuits, DSP-based circuits, ASIC- or FPGA-based circuits, or other digital processing circuitry. More broadly, the processing circuitry 22 comprises fixed circuitry, programmed circuitry, or a mix of fixed and programmed circuitry. Here, "fixed" circuitry denotes circuitry that is preconfigured to carry out particular operations or functions, while programmed circuitry takes on such configuration as a consequence of program instruction execution.

Figure 3:
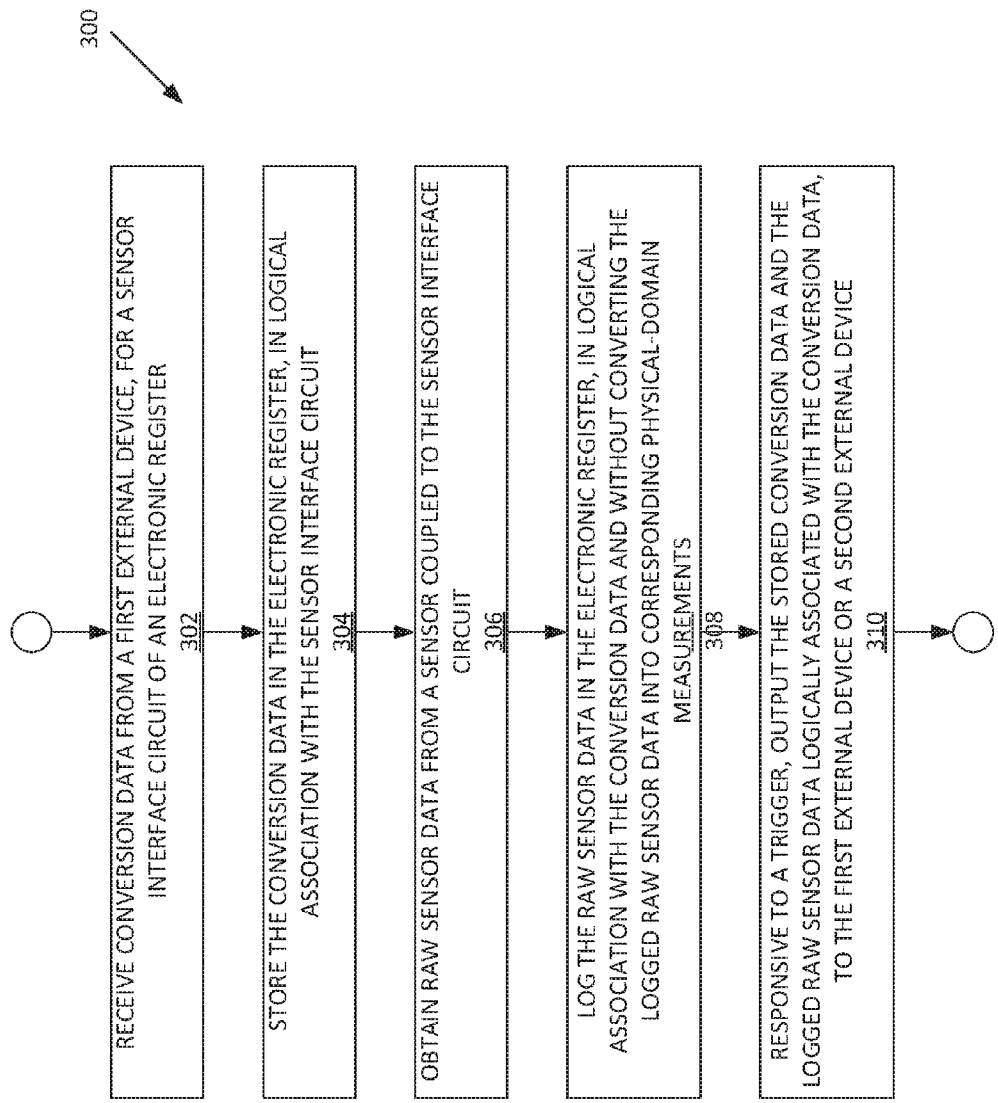
FIG. 3 is a logic flow diagram of one embodiment of a method of operation at an electronic register.

FIG. 3 illustrates a method 300 that may be implemented via the electronic register 12 of FIG. 1, or by another suitable register configuration. The method 300 includes receiving (Block 302) conversion data from an external device 32, via communication interface circuitry 14 of the electronic register 12, for a sensor interface circuit 20 of the electronic register 12. The conversion data comprises information for converting raw sensor data obtained from an external sensor 30 coupled to the sensor interface circuit 20 into corresponding physical-domain measurements.

The method 300 further includes storing (Block 304) the conversion data in the electronic register 12, in logical association with the sensor interface circuit 20, obtaining (Block 306) the raw sensor data from the external sensor 30, via the sensor interface circuit 20, and logging (Block 308) the raw sensor data in the electronic register 12, in logical association with the stored conversion data, and without converting the logged raw sensor data into the corresponding physical-domain measurements. Still further, the method 300 includes, responsive to a trigger, outputting (Block 310) the stored conversion data and the logged raw sensor data logically-associated with the stored conversion data, to the external device 32 (e.g., to any of devices 32-1 or 32-2, or the radio network node 36), via the communication interface circuitry 14 of the electronic register 12.

Figure 4:
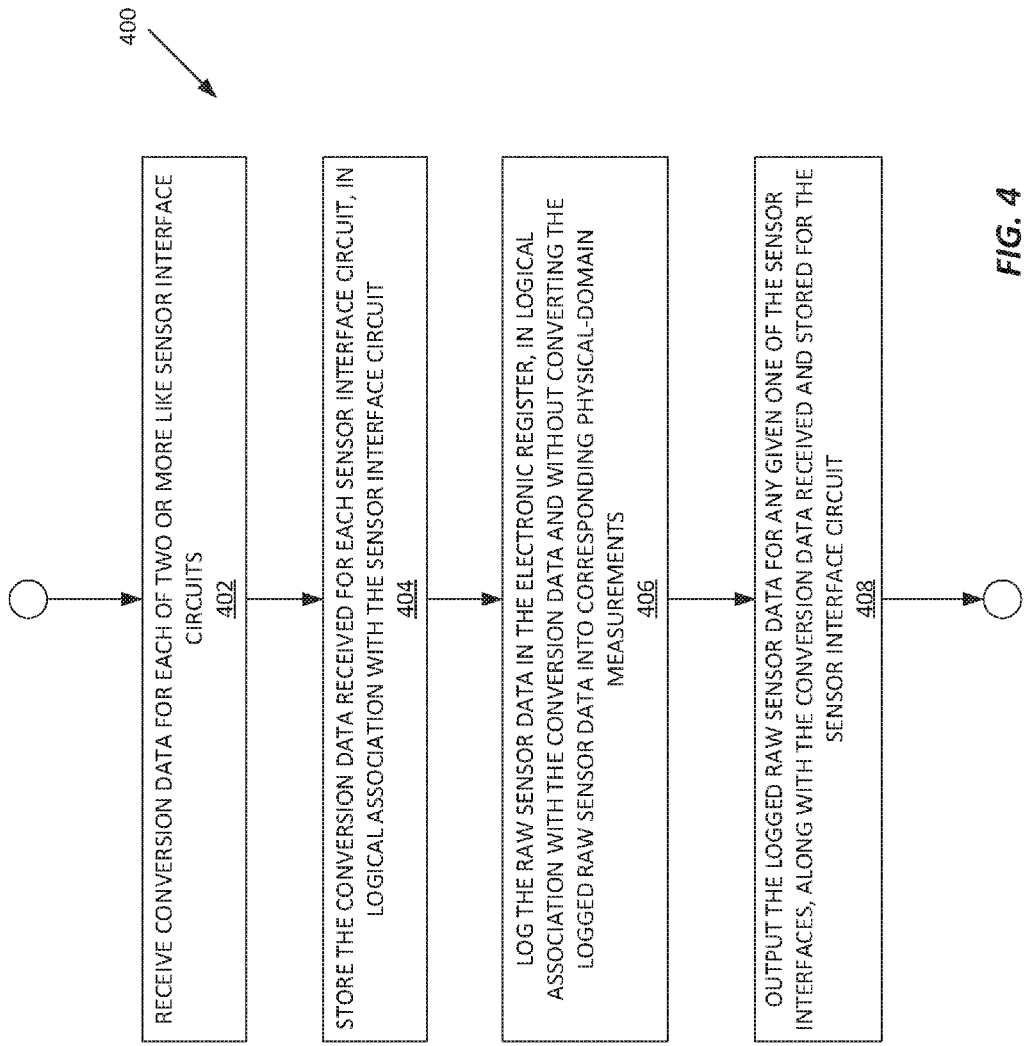
FIG. 4 is a logic flow diagram of another embodiment of a method of operation at an electronic register.

FIG. 4 illustrates a method 400, which may be understood as a more detailed example or variation of the method 300. The method 400 includes receiving (Block 402) conversion data for each of two or more sensor interface circuits 20 of the electronic register 12, wherein the conversion data received for each sensor interface circuit 20 comprises information for converting raw sensor data obtained from the sensor interface circuit 20 into corresponding physical-domain measurements.

The method 400 further includes storing (Block 404) the conversion data received for each sensor interface circuit 20 in logical association with the sensor interface circuit 20, and logging (Block 406) the raw sensor data obtained from each sensor interface circuit 20 in logical association with the conversion data received and stored for the sensor interface circuit 20, and without converting the raw sensor data into the corresponding physical-domain measurements. Still further, the method 400 includes outputting (Block 408) the logged raw sensor data for any one of the sensor interface circuits 20 to an external device 32, along with the conversion data received and stored for the sensor interface circuit 20, thereby enabling the external device 32 to convert the logged raw sensor data into the corresponding physical-domain measurements.

Figure 5:
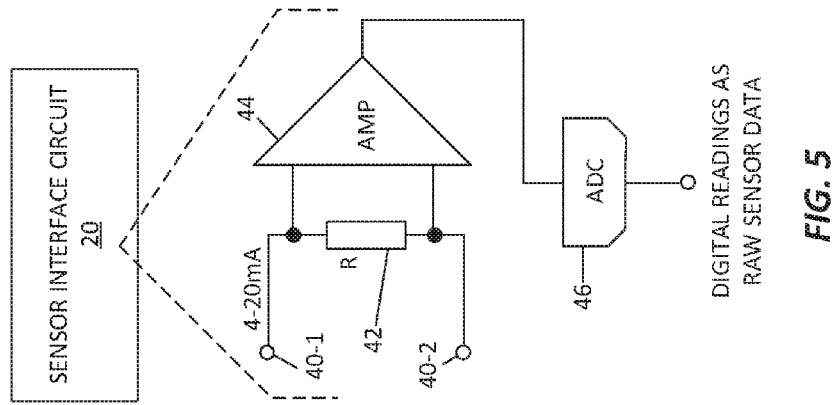
FIG. 5 is a schematic diagram of one embodiment of a sensor interface circuit configured for obtaining raw sensor data from an external sensor.

FIG. 5 depicts an example sensor interface circuit 20. By way of non-limiting example, the illustrated sensor interface circuit 20 is configured to receive a 4-20 mA current signal and includes terminals 40-1 and 40-2, for connecting with the current-carrying wiring from an external sensor 30, along with a resistor 42 ("R" in the diagram) used to develop a voltage signal proportional to the input current signal. An amplifier 44 ("AMP") outputs a voltage-mode signal corresponding to the voltage developed across the resistor 42, and an ADC 46 digitizes the output signal from the amplifier 44. The processor circuitry 22 logs the ADC counts as the raw sensor data for the attached external sensor 30. It will be appreciated that the amplifier 44 may be configured to provide buffering, filtering, gain, or other signal-conditioning, and that the sensor interface circuit 20 may include circuitry not shown, e.g., ESD protection circuitry, etc.

Notably, modifications and other embodiments of the disclosed invention(s) will come to mind to one skilled in the art having the benefit of the teachings presented in the preceding descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method implemented by an electronic register comprising:
   receiving conversion data from a first external device, via communication interface circuitry of the electronic register, for a sensor interface circuit of the electronic register, said conversion data comprising information for converting raw sensor data obtained from an external sensor coupled to the sensor interface circuit into corresponding physical-domain measurements;
   storing the conversion data in the electronic register, in logical association with the sensor interface circuit;
   obtaining the raw sensor data from the external sensor, via the sensor interface circuit, and logging the raw sensor data in the electronic register, in logical association with the stored conversion data, and without converting the logged raw sensor data into the corresponding physical-domain measurements; and
   responsive to a trigger, outputting the stored conversion data and the logged raw sensor data logically-associated with the stored conversion data, to the first external device, or to a second external device, via the communication interface circuitry of the electronic register.

2. The method of claim 1, wherein obtaining the raw sensor data from the external sensor comprises reading a sensor signal output from the external sensor and normalizing the readings according to a defined numeric representation.

3. The method of claim 2, wherein normalizing the readings according to the defined numeric representation comprises formatting the readings according to a defined fixed-point or floating-point data type used by the electronic register.

4. The method of claim 1, wherein obtaining the raw sensor data from the external sensor comprises reading an analog sensor signal output from the external sensor, based on digitizing the analog sensor signal into corresponding digital readings.

5. The method of claim 1, wherein obtaining the raw sensor data from the external sensor comprises reading a digital or analog signal output from the external sensor, said digital or analog signal indicating count values, and wherein logging the raw sensor data comprises logging the indicated count values.

6. The method of claim 1, wherein the electronic register includes at least two sensor interface circuits, and wherein the method includes receiving and storing respective conversion data for each of the sensor interface circuits, logging the raw sensor data obtained for each sensor interface circuit in logical association with the respective stored conversion data, and, when outputting the logged raw sensor data for any given one of the sensor interface circuits, outputting the respective stored conversion data.

7. The method of claim 6, wherein the at least two sensor interface circuits include at least two like sensor interface circuits.

8. The method of claim 7, wherein the at least two like sensor interface circuits comprise two or more analog current loop interfaces or two or more analog voltage interfaces having like nominal current or voltage ranges.

9. The method of claim 1, further comprising:
   receiving an alarm threshold for the sensor interface circuit, said alarm threshold expressed as a unit-less numeric value in a same numeric range as used for the logged raw sensor data obtained from the external sensor;
   storing the alarm threshold in logical association with the sensor interface circuit; and
   outputting an alarm signal responsive to determining that the logged raw sensor data violates the alarm threshold.

10. The method of claim 9, further comprising receiving, storing, and subsequently outputting reverse conversion data for the sensor interface circuit, said reverse conversion data comprising information for converting the physical-domain measurements into corresponding raw sensor data values, thereby enabling the first or second external device to use the reverse conversion data to convert physical-domain alarm thresholds expressed in physical-domain measurement units into corresponding unit-less alarm thresholds for the electronic register.

11. The method of claim 1, wherein the communication interface circuitry includes a radio transceiver, and wherein outputting the stored conversion data and the logged raw sensor data comprises transmitting the stored conversion data and the logged raw sensor data to a radio network node, as said first or second external device.

12. The method of claim 1, wherein the first or second external device comprises a portable communication unit for reading or configuring the electronic register, and wherein the method includes communicating with the portable communication unit via a local wired or wireless connection.

13. An electronic register comprising:
communication interface circuitry configured for communicating with one or more external devices;
a sensor interface circuit configured to interface with an external sensor;
processing circuitry including or operatively associated with the communication interface circuitry, the sensor interface circuit, and storage, said processing circuitry configured to:
receive conversion data from a first external device, for the sensor interface circuit, said conversion data comprising information for converting raw sensor data obtained from the external sensor into corresponding physical-domain measurements;
store the conversion data in the storage, in logical association with the sensor interface circuit;
obtain the raw sensor data from the external sensor, via the sensor interface circuit, and log the raw sensor data in the storage, in logical association with the stored conversion data, and without converting the logged raw sensor data into the corresponding physical-domain measurements; and
responsive to a trigger, output the stored conversion data and the logged raw sensor data logically associated with the stored conversion data, to the first external device, or to a second external device.

14. The electronic register of claim 13, wherein the processing circuitry is configured to obtain the raw sensor data from the external sensor by reading a sensor signal output from the external sensor and normalizing the readings according to a defined numeric representation.

15. The electronic register of claim 14, wherein the processing circuitry is configured to normalize the readings according to the defined numeric representation by formatting the readings according to a defined fixed-point or floating-point data type used by the electronic register.

16. The electronic register of claim 13, wherein the processing circuitry is configured to obtain the raw sensor data from the external sensor as digital readings obtained from the sensor interface circuit, which sensor interface circuit is configured to digitize an analog sensor signal output by the external sensor.

17. The electronic register of claim 13, wherein the processing circuitry is configured to obtain the raw sensor data from the external sensor by reading, via the sensor interface circuit, a digital or analog signal output from the external sensor, said digital or analog signal indicating count values, and to log the raw sensor data by logging the indicated count values.

18. The electronic register of claim 13, wherein the electronic register includes at least two sensor interface circuits, and wherein the processing circuitry is configured to receive and store respective conversion data for each of the sensor interface circuits, log the raw sensor data obtained for each sensor interface circuit in logical association with the respective stored conversion data, and, when outputting the logged raw sensor data for any given one of the sensor interface circuits, to output the respective stored conversion data.

19. The electronic register of claim 18, wherein the at least two sensor interface circuits include at least two like sensor interface circuits.

20. The electronic register of claim 19, wherein the at least two like sensor interface circuits comprise two or more analog current loop interfaces or two or more analog voltage interfaces having like nominal current or voltage ranges.

21. The electronic register of claim 13, wherein the processing circuitry is further configured to:
receive an alarm threshold for the sensor interface circuit, said alarm threshold expressed as a unit-less numeric value in a same numeric range as used for the logged raw sensor data obtained from the external sensor;
store the alarm threshold in logical association with the sensor interface circuit; and
output an alarm signal responsive to determining that the logged raw sensor data violates the alarm threshold.

22. The electronic register of claim 21, further wherein the processing circuitry is configured to receive, store, and subsequently output reverse conversion data for the sensor interface circuit, said reverse conversion data comprising information for converting the physical domain measurements into corresponding raw sensor data values, thereby enabling the first or second external device to use the reverse conversion data to convert physical-domain alarm thresholds expressed in physical-domain measurement units into corresponding unit-less alarm thresholds for the electronic register.

23. The electronic register of claim 13, wherein the communication interface circuitry includes a radio transceiver, and wherein the electronic register is configured to output the stored conversion data and the logged raw sensor data logically associated with the stored conversion data, based on transmitting the stored conversion data and the logged raw sensor data to a radio network node, as said first or second external device.

24. The electronic register of claim 13, wherein the first or second external device comprises a portable communication unit for reading or configuring the electronic register, and wherein the electronic register is configured to communicate with the portable communication unit via a local wired or wireless connection.

25. A method implemented by an electronic register comprising:
receiving conversion data for each of two or more sensor interface circuits of the electronic register, wherein the conversion data received for each sensor interface circuit comprises information for converting raw sensor data obtained from the sensor interface circuit into corresponding physical-domain measurements;
storing the conversion data received for each sensor interface circuit in logical association with the sensor interface circuit;
logging the raw sensor data obtained from each sensor interface circuit in logical association with the conversion data received and stored for the sensor interface circuit, and without converting the raw sensor data into the corresponding physical-domain measurements; and
outputting the logged raw sensor data for any one of the sensor interface circuits to an external device, along with the conversion data received and stored for the sensor interface circuit, thereby enabling the external device to convert the logged raw sensor data into the corresponding physical-domain measurements.

* * * * *